(12) United States Patent
Lauzon

(10) Patent No.: US 6,247,499 B1
(45) Date of Patent: Jun. 19, 2001

(54) PIPE WRAP CORROSION PROTECTION SYSTEM

(75) Inventor: Peter Lauzon, Houston, TX (US)

(73) Assignee: ICO, Inc., Houston, TX (US)

(*) Notice: Subject to any disclaimer, the term of this patent is extended or adjusted under 35 U.S.C. 154(b) by 0 days.

(21) Appl. No.: 09/374,743

(22) Filed: Aug. 13, 1999

(51) Int. Cl.⁷ ............................................. F16L 9/147
(52) U.S. Cl. ............................ 138/143; 138/99; 138/146
(58) Field of Search ................................ 138/127, 99, 143, 138/146, 103

(56) References Cited

U.S. PATENT DOCUMENTS

| | | | |
|---|---|---|---|
| 3,770,556 | 11/1973 | Evans et al. | 161/39 |
| 3,790,418 | 2/1974 | Huvey et al. | 156/79 |
| 4,131,701 * | 12/1978 | Van Auken | 138/143 |
| 4,173,670 * | 11/1979 | Van Auken | 138/143 |
| 4,200,676 | 4/1980 | Caponigro et al. | 428/57 |
| 4,213,486 | 7/1980 | Samour et al. | 138/143 |
| 4,357,961 | 11/1982 | Chick | 138/97 |
| 4,359,502 | 11/1982 | Caponigro et al. | 428/251 |
| 4,437,495 | 3/1984 | Zonsveld | 138/144 |
| 4,442,053 | 4/1984 | Pickering et al. | 264/36 |
| 4,504,086 | 3/1985 | Carrow | 285/156 |
| 4,507,340 * | 3/1985 | Rinde et al. | 138/143 |
| 4,519,856 | 5/1985 | Lazzara | 156/49 |
| 4,552,183 | 11/1985 | Chick | 138/99 |
| 4,756,337 | 7/1988 | Settineri | 138/99 |
| 4,777,084 | 10/1988 | Marteness | 428/272 |
| 4,803,104 | 2/1989 | Peigneur et al. | 428/35.1 |
| 4,900,596 | 2/1990 | Peacock | 428/34.5 |
| 4,946,528 | 8/1990 | Takahashi et al. | 156/187 |
| 4,997,067 * | 3/1991 | Watts | 188/251 |
| 5,210,128 | 5/1993 | Johnson | 524/609 |
| 5,286,561 | 2/1994 | Johnson et al. | 428/375 |
| 5,348,801 | 9/1994 | Venzi et al. | 428/354 |
| 5,423,932 | 6/1995 | Schinabeck | 156/94 |
| 5,445,848 | 8/1995 | Venzi et al. | 427/142 |
| 5,482,087 | 1/1996 | Overbergh et al. | 138/110 |
| 5,536,349 | 7/1996 | Marzola et al. | 156/187 |
| 5,624,744 | 4/1997 | Driggett, Sr. | 442/129 |
| 5,629,065 | 5/1997 | Schinabeck | 428/63 |
| 5,632,307 | 5/1997 | Fawley et al. | 138/99 |
| 5,713,393 * | 2/1998 | Johnson et al. | 138/143 |
| 5,720,834 | 2/1998 | Steele et al. | 156/86 |
| 5,732,743 | 3/1998 | Livesay | 138/99 |
| 5,780,583 | 7/1998 | Lubowitz et al. | 528/388 |
| 5,786,053 * | 7/1998 | Andrenacci et al. | 138/146 |
| 5,814,387 | 9/1998 | Orihara et al. | 428/63 |
| 5,965,682 * | 11/1999 | Peterson et al. | 526/346 |
| 6,030,672 * | 2/2000 | Usui | 138/146 |
| 6,059,908 * | 5/2000 | Van Beersel | 138/144 |
| 6,113,998 * | 9/2000 | Aizawa et al. | 138/146 |

\* cited by examiner

*Primary Examiner*—James Hook
(74) *Attorney, Agent, or Firm*—Jenkens & Gilchrist, a Professional Corporation

(57) ABSTRACT

A system for protecting pipe, tubing, or associated apparatus in high acidic and/or high temperature environments includes a non-woven polyphenylene sulfide fabric saturated with a mixture of bisphenol A liquid epoxy and a cycloaliphatic amine curing agent.

7 Claims, 1 Drawing Sheet

PIPE WRAP CORROSION PROTECTION SYSTEM

FIELD

The present invention pertains to corrosion protecting pipe or tubing and associated equipment, such as valves, elbows, tee's, and other equipment typically used with pipe or tubing. More particularly, the present invention pertains to a method of protecting the exposed outer surface of an uncoated pipe or repairing a break in a pipe coating with a corrosion protecting wrap.

BACKGROUND

Pipes, typically used for the transport of fluids such as natural gas and extraction of petroleum crude products, are frequently subject to the harmful effects of corrosion. Such corrosion often occurs when unprotected metal pipes are buried in trenches dug in the ground or used in subterranean well applications.

To protect the exterior surface of pipes against the corrosive effects of soil and/or fluids, various different methods of coating the exterior surface of pipes appear in the prior art. One popular method of coating the exterior surface of pipes involves the application of a fusion bonded epoxy around the outside of the pipe. This fusion bonded epoxy protects the exposed metal on the outer surface of the pipe from the corrosive effects of chemicals in the atmosphere or chemicals contained in soil.

It has been found that because of the brittle nature of a fusion bonded epoxy coating around pipes, the coating is easily broken or cracked if the coated pipe is subject to rough handling. Breaks or cracks in the fusion bonded epoxy coating may allow moisture or corrosive chemicals to migrate through the outer protective layer of fusion bonded epoxy and corrode the exterior metal surface of the pipe. Accordingly, there is a need for a method that will allow for the repair of the corrosion coating placed around pipes after a holiday or break has occurred in the fusion bonded epoxy protective coating.

One prior art method of protecting the exterior surfaces of pipe, tubing, and associated equipment—particularly pipe, tubing, or associated equipment to be placed in a trench or a ditch dug in soil—is to wrap the pipe, tubing, or associated equipment with a fabric which has been saturated with an epoxy. One example of a prior art method and product is a Hempel NAP-WRAP Epoxy 8553. This product is designed for coating the exterior surface of pipelines which have been placed in a ditch or to repair pipe or tubing coatings that have failed in service.

While the Hempel NAP-WRAP Epoxy 8553 product has been effective in some mildly corrosive environments, it will not withstand harsh environments such as those characterized by the presence of either strong acids or high temperatures, (above 225° F.) or both.

Accordingly, there is a need in the art to provide a product which will protect the exterior surfaces of pipes and associated equipment from corrosion in environments which are strongly acidic and which are characterized by a high ambient temperature.

SUMMARY

The present invention provides a system for protecting the exterior surface of pipes against corrosion in environments which are strongly acidic or are characterized by a high ambient temperature.

The inventor herein has found that by using a chemically resistant fabric and selected prior art epoxy resin mixtures, a corrosion barrier system is provided that will maintain protection at temperatures above 225° F., even up to 350° F. Further, the present invention will provide corrosion protection in environments characterized by the presence of a strong acid and/or high temperatures.

The fabric material selected for the wrap and method of the present invention is a non-woven Polyphenylene Sulfide (PPS). In the preferred embodiment, the nonwoven Polyphenylene Sulfide fabric is from 0.010 to 0.050 inches thick.

Before being wrapped around the pipe, the Polyphenylene Sulfide fabric is saturated with a bisphenol A epoxy, lower molecular weight liquid (100% solids) resin. Mixed with the bisphenol A epoxy liquid resin is an epoxy cure agent. In the preferred embodiment, this epoxy cure agent is a cycloaliphatic amine. If desired, fibers and modifiers may be added to the mixture of the liquid epoxy resin and the epoxy curing agent.

BRIEF DESCRIPTION OF THE DRAWING FIGURES

A better understanding of the method of the present invention may be had by reference to the drawing figures wherein.

DESCRIPTION OF THE EMBODIMENTS

Figure 2:
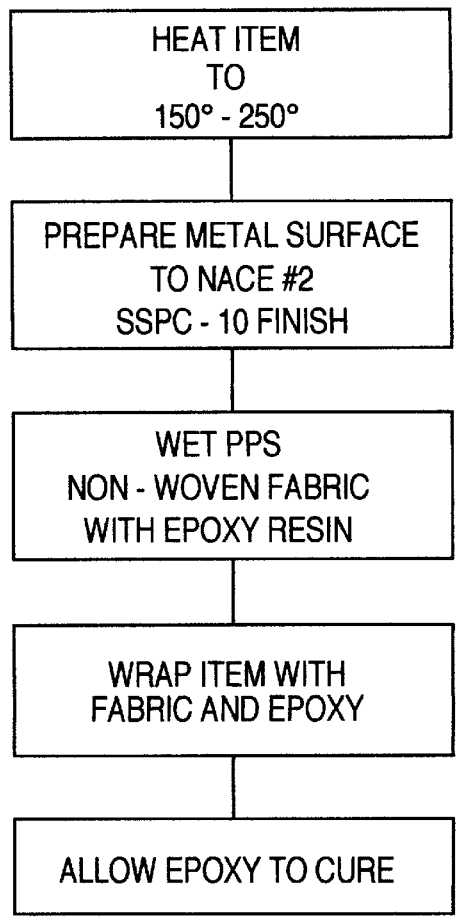
FIG. 2 is a block diagram of the method of the present invention.

As shown in FIG. 2, the method for protecting pipe, tubing, and associated equipment of the present invention from corrosion in high acid and/or high temperature environments begins by heating the pipe to a temperature between 150° and 250° F. The external surface to be coated is prepared to a near-white (NECE #2, SSPC-10), surface finish.

Once the external surface to be coated has been prepared, a non-woven Polyphenylene Sulfide (PPS) fabric membrane is wetted with an epoxy resin mixture. The epoxy resin mixture uses a bisphenol A liquid epoxy with a cycloaliphatic amine curing agent. Alternatively, other curing agents such as modified aliphates and aromatic amines may be used. Preferably, the ratio of bisphenol A liquid epoxy to the curing agent by epoxide equivalent to amine equivalent weight is roughly even or about 1.0 to about 1.0; however, ratios ranging from 1.2:0.8 to 0.8:1.2 may be used. If desired, fillers may be added to the epoxy. Such fillers may include micas, clays, wollastonites, talcs, sulfates, and silicates. If fillers are added, the amount of such fillers by weight to the weight of the bisphenol A liquid epoxy may range from 1.0:9.0 to 1.0:1.0. The epoxy resin saturated fabric is then applied to the pipe before the epoxy resin is fully cured. After the PPS fabric membrane, which has been saturated with uncured resin, has been applied to the exterior surface of the pipe, the epoxy resin is allowed to cure.

Figure 1:
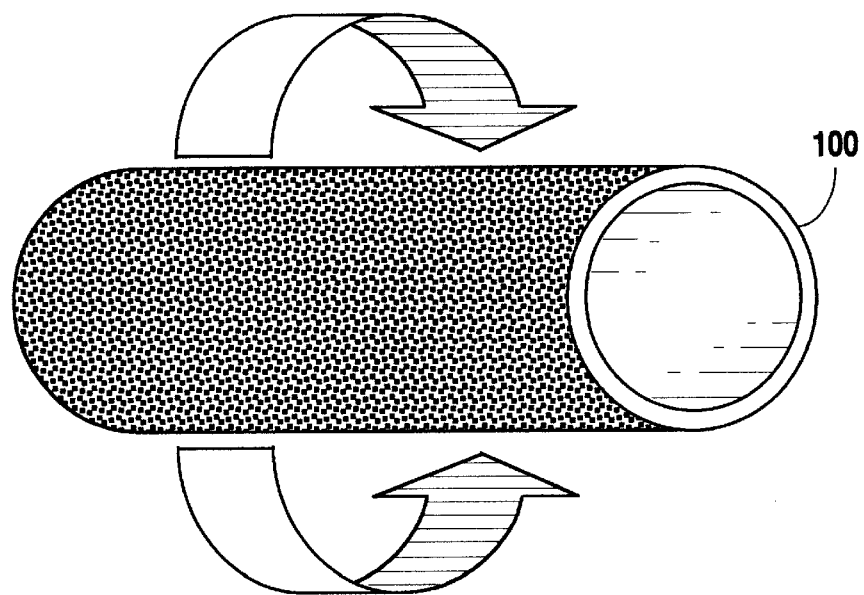
FIG. 1 is a perspective view of the pipe wrapping operation.

As shown in FIG. 1, it has been found that the epoxy saturated fabric is best applied by spirally wrapping a continuous strip of the non-woven PPS fabric membrane around the metal surface of the pipe or around an epoxy coating which has been formed around the pipe 100. To insure that all surfaces of the pipe 100 or of the epoxy coating around the pipe 100 are covered with the saturated PPS fabric membrane, an overlap of the saturated PPS fabric membrane is required. This overlap may range from either 10% up to 150% of the width of the PPS saturate fabric membrane. When the 150% overlap system is used, this effectively results in a three-layer barrier of protection.

While the foregoing system has been described for its use in protecting the exposed exterior surface of metal pipe, it may also be used to repair breaks or holidays in the corrosion protection layer of pipes already in service. Such protection layers may include paints, coatings, fusion bonded epoxy, etc. When a break or holiday in a corrosion protection layer is found, the epoxy saturated PPS fabric is simply wrapped around the pipe, tubing or associated equipment to cover the break or holiday, and then the epoxy is allowed to cure or to harden over the damaged protection byer.

Changes or modifications to the specifically described embodiment may be carried out without departing from the scope of the invention, which is intended to be limited only by the scope of the appended claims.

What is claimed is:

1. A corrosion barrier for an elongated tubular member or associated equipment used in acidic and/or high temperature environments comprising:
   a wrapable nonwoven fabric made from Polyphenylene Sulfide (PPS);
   said wrapable nonwoven fabric being saturated with a mixture of bisphenol A liquid epoxy and a cycloaliphatic amine curing agent.

2. The moisture resistant corrosion barrier as defined in claim 1 wherein a filler is added to the mixture of said bisphenol A liquid epoxy and said cycloaliphatic amine curing agent.

3. A section of pipe or tubing comprising:
   an elongated cylindrical metallic tubular member;
   a corrosion barrier formed of:
      a wrapable nonwoven fabric membrane made from Polyphenylene Sulfide (PPS);
      said wrapable nonwoven fabric being saturated with a mixture of bisphenol A liquid epoxy and a cycloaliphatic amine cure agent.

4. The section of pipe or tubing as defined in claim 3 wherein the ratio, by weight, of bisphenol A liquid epoxy to cycloaliphatic amine curing agent is from about 1.2:0.8 to about 0.8:1.2.

5. The section of pipe or tubing as defined in claim 3 wherein a filler is added to the mixture of bisphenol A liquid epoxy and cycloaliphatic amine curing agent.

6. The section of pipe or tubing as defined in claim 5 wherein the ratio of filler to bisphenol A liquid epoxy is from about 1.2:0.8 to about 0.8:1.2.

7. The section of pipe or tubing as defined in claim 5 wherein the filler is selected from the group of fillers including micas, clays, wollastonites, talcs, sulphates, and silicates.

* * * * *